UNITED STATES PATENT OFFICE.

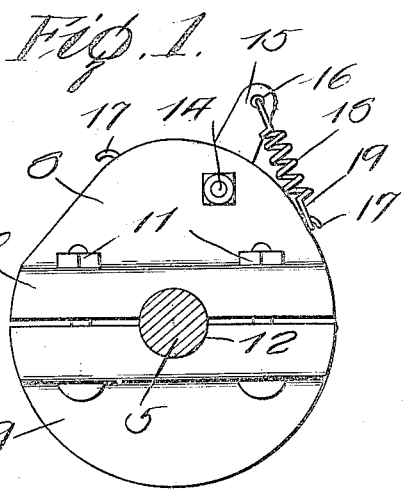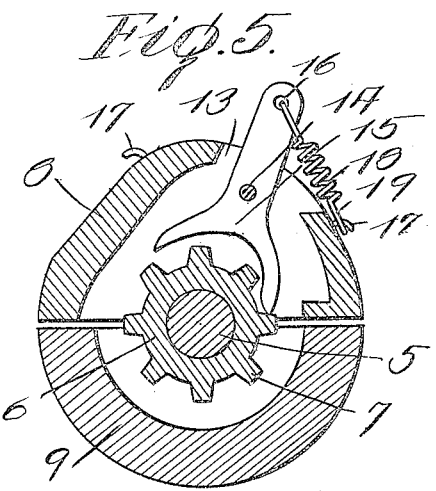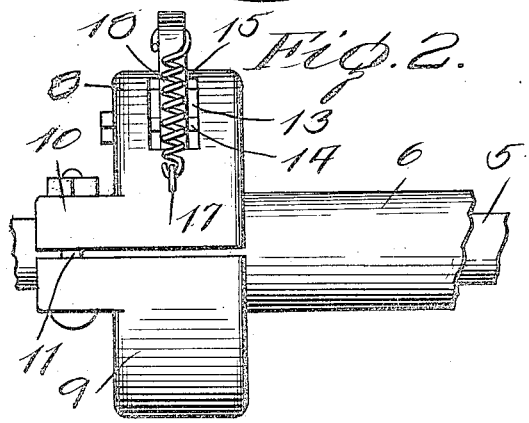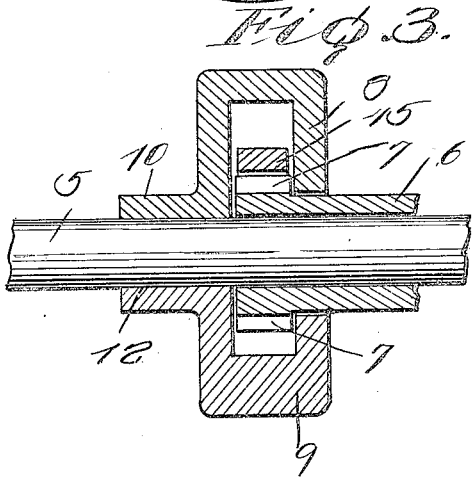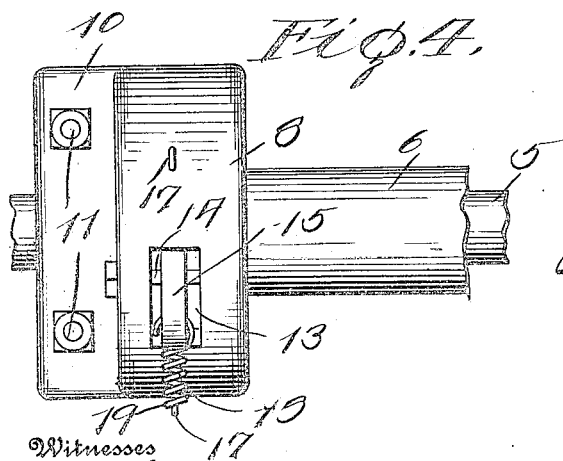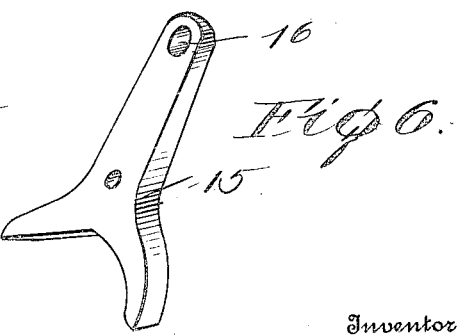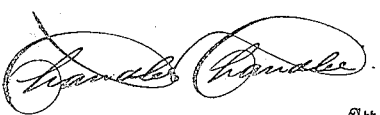

JOHN H. SMITH, OF HAMMOND, TEXAS.

RATCHET-CLUTCH.

1,140,199.                    Specification of Letters Patent.    Patented May 18, 1915.

Application filed July 21, 1913. Serial No. 780,355.

*To all whom it may concern:*

Be it known that I, JOHN H. SMITH, a citizen of the United States, residing at Hammond, in the county of Robertson, State of Texas, have invented certain new and useful Improvements in Ratchet-Clutches; and I do hereby declare the following to be a full, clear, and exact description of the invention, such as will enable others skilled in the art to which it appertains to make and use the same.

This invention relates to new and useful improvements in ratchet clutches which are particularly adapted for vehicle wheels.

The object of the invention resides in the provision of a clutch to be applied to the axle of an agricultural implement to permit free counter-clockwise motion of the wheel but to lock the wheel to the axle upon clockwise motion thereof and the invention further contemplates the provision of means whereby this action may be reversed so that the clutch may be applied to either end of the axle.

A further object of the invention resides in the provision of a device of the class described which shall comprise a minimum number of parts so that it will not readily get out of order and so that it may be manufactured at a comparatively low cost.

With these and other objects in view, the invention resides in the novel combination, formation and arrangement of parts to be more fully hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is an end view of an axle with the improved clutch means positioned thereon, Fig. 2 is a side elevational view of what is shown in Fig. 1, Fig. 3 is a vertical sectional view taken through the device, Fig. 4 is a top plan view of the device, Fig. 5 is a transverse sectional view of the device taken on a horizontal plane, and Fig. 6 is a perspective view of the pawl.

Referring now more particularly to the drawings, 5 designates a portion of a stationary axle and 6 is a sleeve rotatable thereon which is connected to the hub of a wheel (not shown). One end of this sleeve is adapted to extend past the hub of the wheel and is provided with a head at one end which has the gear teeth 7 formed on its periphery. To provide a support for a double acting pawl for engaging these teeth to lock the sleeve at times to the axle, a casing is provided comprising upper and lower sections 8 and 9 respectively provided with contacting flanges 10 and bolts 11 passed through said flanges to hold the parts in relation. The contacting faces of the flanges are cut away to provide a bore 12 in which is clamped the axle. The sleeve is rotatably passed through the casing and has its head held in the interior thereof. The top of the section 8 of the casing is provided with a slot 13 in which is pivotally mounted by means of the bolt 14 a double acting pawl 15, the lower end of which is bifurcated to provide the ratchet engaging portions. The top of the pawl is extended above the casing and provided with an eye 16. Bolts 17 are positioned on the outer periphery of the casing on each side of the slot and a coil spring 18 has one end secured to the said eye and has its other end provided with an eye 19 whereby it may be engaged with either of the hooks. When the spring is connected to the eye of the pawl and to a hook on one side of the casing the ratchet engaging portions of the pawl are swung to the opposite side of the casing and serves to lock the sleeve against rotation in one direction with relation to the axle, thus the wheels can be locked against either clockwise or counter clockwise movement.

In agricultural and other machines this arrangement finds an especial application in that the clutch can be applied to either end of the axle, thus obviating the necessity of providing right and left hand clutches.

From the foregoing it is observed that a structure of maximum simplicity has been provided, which is at the same time efficient in operation and which will not readily get out of order.

What is claimed is:

1. A clutch comprising an axle, a casing fixed to the axle, a sleeve rotatable on the axle, a head on the sleeve disposed in the casing and provided with ratchet teeth, a pawl pivoted to the casing to selectively engage the ratchet teeth to prevent the rotation of the sleeve in either direction, and resilient means for maintaining said pawl in engagement with the ratchet teeth.

2. A clutch comprising the combination with an axle, of a casing clamped thereon, a sleeve rotatable on the axle, a head on the sleeve provided with ratchet teeth on its periphery and disposed in the casing, a pawl pivoted to the casing and having its inner end bifurcated and means for resiliently holding the pawl to selectively lock the sleeve against clockwise or counter-clockwise motion.

In testimony whereof, I affix my signature, in the presence of two witnesses.

JOHN H. SMITH.

Witnesses:
E. H. BATES,
WALTER LOVE.

Copies of this patent may be obtained for five cents each, by addressing the "Commissioner of Patents, Washington, D. C."